United States Patent [19]
Loos

[11] Patent Number: 5,735,676
[45] Date of Patent: Apr. 7, 1998

[54] METHOD AND DEVICE FOR THE AUTOLUBRICATION OF THE ROLLING BEARINGS OF TURBOMACHINES

[75] Inventor: Markus Loos, Gebenstorf, Switzerland

[73] Assignee: Asea Brown Boveri AG, Baden, Switzerland

[21] Appl. No.: 552,122

[22] Filed: Nov. 2, 1995

[30] Foreign Application Priority Data

Dec. 22, 1994 [DE] Germany ............... 44 45 957.2

[51] Int. Cl.$^6$ ............... F04B 17/00; F16N 7/36
[52] U.S. Cl. ............... 417/407; 415/112; 415/175; 415/176; 415/177; 415/178; 184/6.11; 184/6.16; 184/6.22; 184/31; 184/104.1; 384/465; 384/471; 384/473
[58] Field of Search ............... 415/175, 176, 415/177, 111, 112, 178; 184/6.11, 6.16, 6.22, 31, 104.1; 417/407; 384/465, 471, 473

[56] References Cited

U.S. PATENT DOCUMENTS

| | | |
|---|---|---|
| 2,886,133 | 5/1959 | Mauck et al. |
| 3,420,434 | 1/1969 | Swearingen ............... 415/176 |
| 3,728,857 | 4/1973 | Nichols ............... 415/176 |
| 3,895,689 | 7/1975 | Swearingen ............... 184/6.16 |
| 4,137,997 | 2/1979 | Ando ............... 184/6.22 |
| 4,285,632 | 8/1981 | DeSalve ............... 415/175 |
| 4,743,162 | 5/1988 | Pope ............... 415/175 |
| 4,798,523 | 1/1989 | Glaser et al. ............... 184/6.16 |
| 5,320,196 | 6/1994 | Mouton ............... 184/6.22 |
| 5,513,964 | 5/1996 | Rockwood ............... 415/175 |

FOREIGN PATENT DOCUMENTS

| | | |
|---|---|---|
| 0123989 | 11/1984 | European Pat. Off. |
| 0123991 | 11/1984 | European Pat. Off. |
| 1031467 | 6/1958 | Germany ............... 415/175 |
| 1042779 | 11/1958 | Germany ............... 415/175 |
| 1 088 769 | 9/1960 | Germany. |
| 451714 | 5/1968 | Switzerland. |

*Primary Examiner*—Christopher Verdier
*Attorney, Agent, or Firm*—Burns, Doane, Swecker & Mathis, L.L.P.

[57] ABSTRACT

A method and device for the autolubrication of the rolling bearings of turbomachines. The method and device utilize pressure differences present in the turbomachine for sucking in the lubricating oil. Moreover, a pressure is built up in centrifuges arranged on a shaft, and is used for the direct injection of the lubricating oil into the rolling bearings. For this purpose, an annular element imparting a negative pressure is arranged stationarily on the shaft, and is designed as a negative pressure chamber. The negative pressure chamber is connected via an oil suction conduit to an oil sump holding the lubricating oil and via a first air conduit to a negative pressure region of the turbomachine. The oil sump is connected via a second air conduit to an overpressure region of the turbomachine. A separating point is arranged between the oil suction conduit and the negative pressure region, preferably in the first air conduit.

19 Claims, 3 Drawing Sheets

METHOD AND DEVICE FOR THE AUTOLUBRICATION OF THE ROLLING BEARINGS OF TURBOMACHINES

BACKGROUND OF THE INVENTION

1. Field of the Invention

The invention relates to a method and a device for the autolubrication of the rolling bearings of turbomachines, preferably of internally mounted turbochargers.

2. Discussion of Background

Autolubrication systems which require no external oil pump are often used for supplying oil to the rolling bearings of turbomachines.

A self-priming centrifugal lubricating-oil pump is known from CH-A-451,714. The unit mounted on one shaft end of the turbomachine comprises essentially a centrifuge with a retaining edge and with auxiliary ducts adjacent thereto for the discharge of excess lubricating oil as well as with a rotating pump rotor having radial bores. The effect of centrifugal force on the air column rotating in the bores generates a negative pressure, by means of which oil is sucked via the oil suction conduit out of an oil sump into the centrifuge. The retaining edge and the auxiliary ducts prevent this oil from flowing off via the bores of the disk. They therefore act as a separating point between the lubricating oil to be sucked in and the air column imparting the negative pressure. The oil rotating in the centrifuge generates the oil pressure necessary for injection. It is injected from the centrifuge via axial bores directly into the rolling bearing and can subsequently flow off again into the oil sump.

By means of such autolubrication, the availability of the turbocharger can be improved appreciably in comparison with the use of external lubricating-oil pumps. Moreover, the self-priming pump requires no separate drive, and this results in a substantial saving of space.

This system can be designed in a constructively simple way if the centrifuge is located on the shaft end and the oil can be sucked in axially and centrically. In the case of internally mounted turbomachines, that is to say when the bearings are located between the turbine wheel and the compressor wheel, however, implementation is substantially more complicated. Such a solution for internally mounted turbochargers is known from Ep-B1-0,123,991.

In a pump of this type, however, the pressure of the lubricating oil building up in the centrifuge cannot be used directly for its injection into the rolling bearings, as is possible in the solution according to CH-A-451,714. The main reason for this is that, in internally mounted turbochargers, the lubricating oil cannot be supplied axially and centrically. Moreover, the separating point between the lubricating oil to be sucked in and the air column imparting the negative pressure likewise cannot be arranged near the axis of the shaft. Although the oil shutoff holes designed for this purpose are located as near as possible to the shaft, they nevertheless additionally reduce the existing constructional space. The inner radius of the lubricating-oil ring rotating in the centrifuge is therefore larger than the radius on which the injection nozzles are located. However, the condition for effective injection would be a reversed ratio of the two radii.

In order to allow the supply of the lubricating oil to the rolling bearings in spite of the problems mentioned, the swirl transmitted to the oil in the centrifuge is utilized. For this purpose, further ducts and conduits are required. However, they not only make the pump complicated and more expensive, but they also necessitate additional constructional space.

EP-B1-0,123,989 discloses a similar solution, in which the negative pressure is generated as a result of the effect of centrifugal force in the pump rotor. In this case, the lubricating oil is sucked through the rolling bearings into two centrifuges. The pressure difference attainable thereby for the lubrication of the bearings is relatively small. At high rotational speeds, this can lead to the lubricating oil no longer penetrating the air vortex surrounding the bearing. Here too, the lubricating-oil pressure built up by the centrifuges cannot be utilized for injecting the lubricating oil into the bearing points. The centrifuges therefore serve mainly for the separation of dirt.

A disadvantage common to all the solutions mentioned is that the negative pressure required for sucking in the lubricating oil has to be generated first in the centrifuges. However, the pump rotor arranged on the shaft of the turbocharger for this purpose reduces the power of the turbocharger.

SUMMARY OF THE INVENTION

Accordingly, one object of the invention is to provide a novel method and a novel device which avoid all these disadvantages. The object on which it is based is to provide a simple and cost-effective method for the autolubrication of the rolling bearings of turbomachines, preferably of internally mounted turbochargers, and just such a device of as small construction as possible for carrying out the method.

This is achieved, according to the invention, in that, pressure differences present in any case in the turbomachine are utilized for sucking the lubricating oil into the centrifuges. Moreover, the pressure built up in the centrifuges is used directly for injecting the lubricating oil into the rolling bearings. The advantage of this method is that the negative pressure required for sucking in the lubricating oil no longer has to be generated specially. In particular, there is therefore no need for a pump rotor, so that less constructional space is required in the region of the pump. The direct injection of the lubricating oil out of the centrifuges into the rolling bearings likewise results in a saving of components and therefore of constructional space.

In a first embodiment of the invention, there is normal pressure in the oil sump, whilst the lubricating oil passes into the centrifuge by means of negative pressure in a way known per se. Said negative pressure is delivered by a region of the turbomachine generating a negative pressure in any case, preferably by the compressor inlet. For this purpose, the annular element imparting the negative pressure is arranged stationarily around the shaft and is designed as a negative pressure chamber. The negative pressure chamber is connected via an oil suction conduit to the oil sump and via a first air conduit to a region of the turbomachine having a negative pressure in relation to the oil sump. This can also be the turbine outlet in addition to the compressor inlet. A separating point is arranged between the lubricating oil located in the centrifuge and the negative pressure region, specifically preferably in the first air conduit. The oil sump is connected via a second air conduit to an overpressure region of the turbomachine. For example, the ambient air is used as an overpressure region.

In this pump, the inner radius of the lubricating-oil rings rotating in the centrifuges is smaller than the radius on which the injection nozzles are located. Only thereby is it possible, even in the case of internally mounted turbochargers, to utilize the pressure of the lubricating oil building up in the centrifuge directly for its injection into the rolling bearings.

The first air conduit opens out in a wall drillhole of the negative pressure region. It is particularly expedient if a hollow body projecting into the compressor inlet or the turbine outlet and provided with lateral orifices is arranged in the wall drillhole and is connected to the air conduit. The useful negative pressure in this region of the turbomachine is thereby increased, thus, even at low rotational speeds, ensuring the pressure difference between the oil sump and the centrifuges which is necessary for sucking in the lubricating oil.

Alternatively to this, at least one nozzle is arranged in the negative pressure region and is connected at its nozzle neck to the first air conduit. The negative pressure useful for sucking in is further increased as a result of the contraction of the flow in such a nozzle.

It is advantageous, furthermore, if a cooling device is arranged in the oil sump. Such cooling proves beneficial, particularly in the case of turbochargers, since the turbine heating would otherwise lead to a sharp rise in the lubricating-oil temperatures.

In a further embodiment of the invention, normal pressure prevails in the centrifuges and overpressure in the oil sump, the former being supplied by the ambient air and the latter by a region of the turbomachine which in any case generates overpressure.

For this purpose, the oil sump is made at least essentially gastight. The negative pressure chamber is connected via the first air conduit to the ambient air, and the oil sump is connected via the second air conduit to the compressor outlet.

By means of such a method and the corresponding device, even under a very low load there are relatively large pressure differences between the oil sump and the centrifuge. The supply of oil to the rolling bearings is thereby guaranteed under all operating conditions.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings which represent a plurality of exemplary embodiments of the invention with reference to an internally mounted turbocharger having a lubricating-oil pump and wherein.

Only the elements essential for understanding the invention are shown. The direction of flow of the lubricating oil is designated by arrows.

DESCRIPTION OF THE PREFERRED EMBODIMENTS

Figure 1:
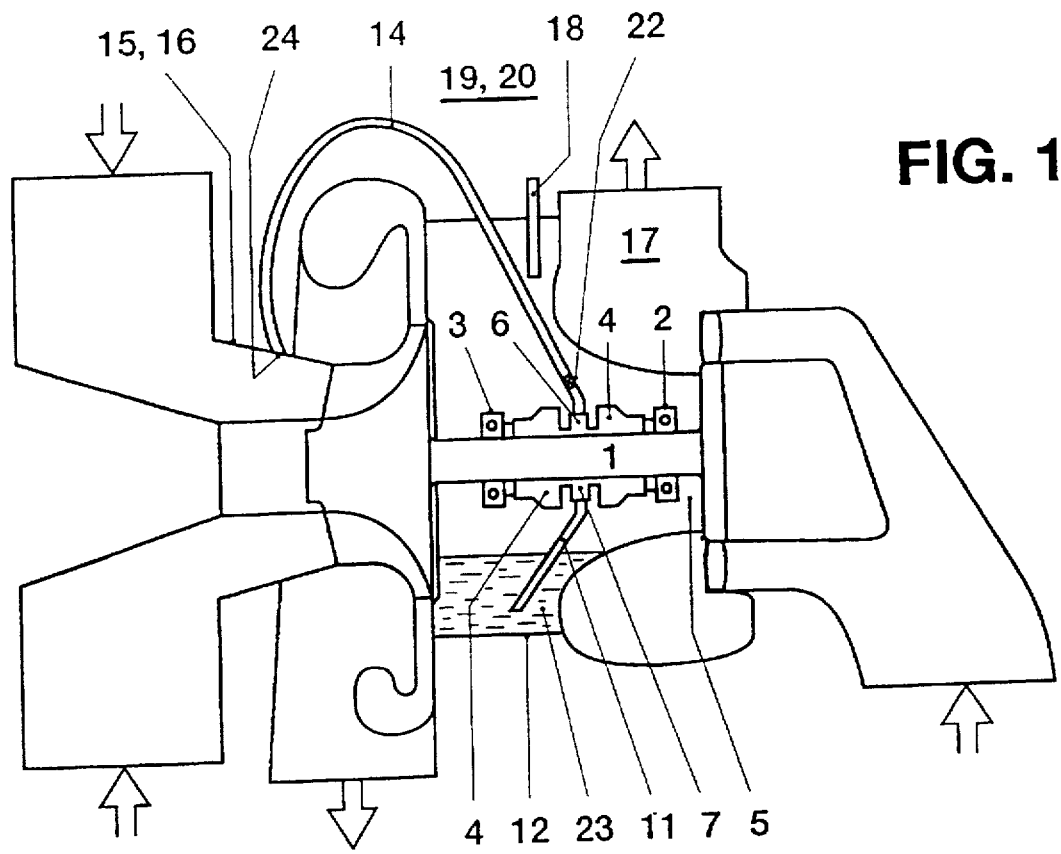
FIG. 1 shows a diagrammatic representation of the turbocharger in a first embodiment.
Figure 2:
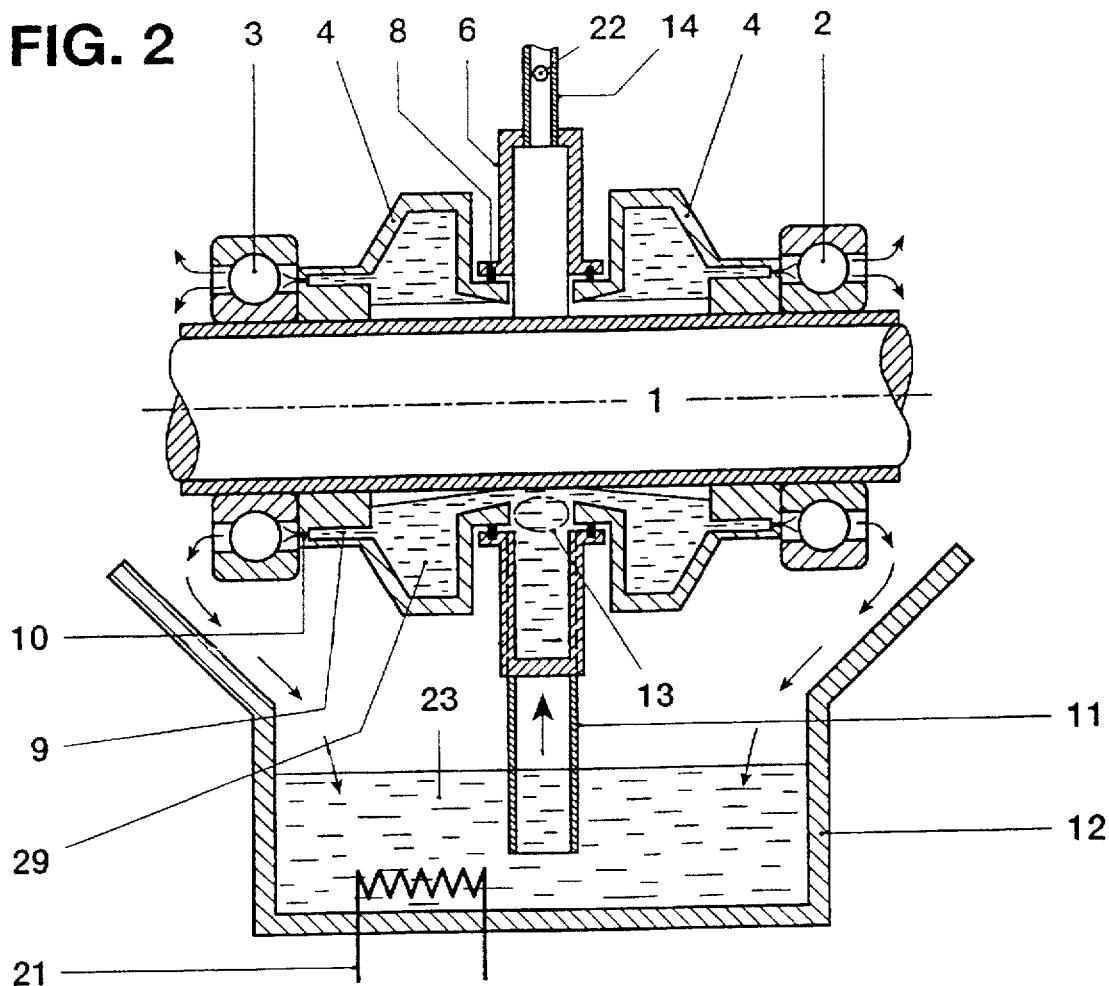
FIG. 2 shows a part longitudinal section through the turbocharger in the region of the lubricating-oil pump, according to FIG. 1.

Referring now to the drawings, wherein like reference numerals designate identical or corresponding parts throughout the several views, in FIG. 1, the shaft 1 of the turbocharger is mounted both on the turbine side and on the compressor bearing side in each case by means of a rolling bearing 2, 3. Two centrifuges 4 are arranged on the shaft 1 and between the rolling bearings 2, 3 in a bearing housing 5. Located between them is an annular element 6 designed as a negative pressure chamber (FIG. 1, FIG. 2).

Figure 6:
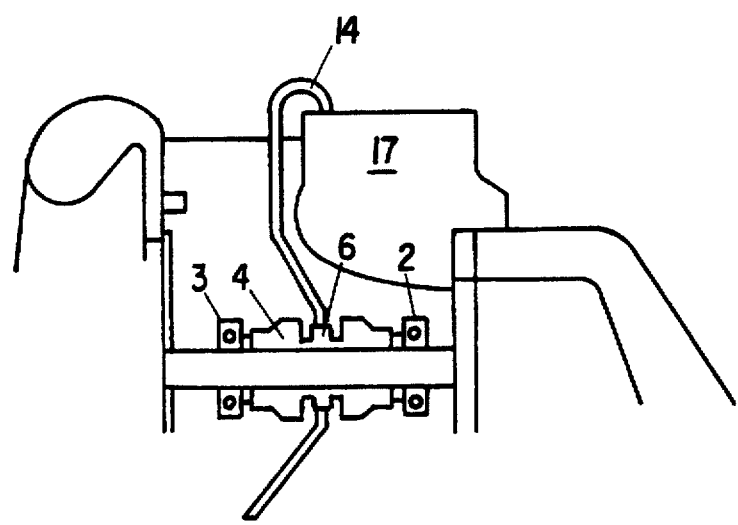
FIG. 6 shows a view of a further embodiment of the turbocharger in the region of the turbine outlet.

The negative pressure chamber 6 is fastened nonrotatably, that is to say stationarily, to the bearing housing 5. Said negative pressure chamber 6 is open in its central region 7 towards the centrifuges 4. Arranged between the negative pressure chamber 6 and the rotating centrifuges 4 are seals 8 (FIG. 2) which are designed as piston rings and which serve for sealing off the centrifuges 4 relative to an oil sump 12. The centrifuges 4 are connected to the rolling bearings 2, 3 via axial lubricating bores 9 which each have an injection nozzle 10. The negative pressure chamber 6 is connected via an oil suction conduit 11 to the oil sump 12. At the same time, the inlet orifice 13 of the oil suction conduit 11 is arranged directly underneath the shaft 1. The negative pressure chamber 6 is connected via a first air conduit 14 to a negative pressure region 15 of the turbocharger, here to the compressor inlet 16 (FIG. 1). Said negative pressure chamber 6 can, of course, likewise be connected to the turbine outlet 17, as shown in FIG. 6, or to another negative pressure region 15 of the turbocharger.

The oil sump 12 is connected by means of a second air conduit 18 to the ambient air 19 which forms an overpressure region 20 in relation to the compressor inlet 16 or to the negative pressure chamber 6. In addition, a cooling device 21 is arranged in the oil sump 12 and takes the form of water cooling.

A float valve designed as a separating point 22 between the lubricating oil 23 supplied to the centrifuges 4 and the compressor inlet 16 is in the first air conduit 14. Of course, other means, for example a hydraulic siphon, can also be used for the same function.

Figure 3:
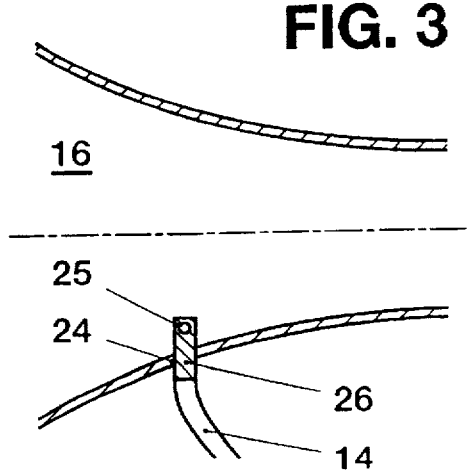
FIG. 3 shows an enlarged detail of the region of the turbocharger having a negative pressure.

The first air conduit 14 opens out in a wall drillhole 24 of the compressor inlet 16 (FIG. 1). Instead of a simple wall drillhole 24, in another embodiment of the invention at least one hollow body 26 which projects into the compressor inlet 16 is provided with at least one lateral orifice 25 and is designed as a small cylindrical tube and is arranged and is connected to the air conduit 14 (FIG. 3).

Figure 4:
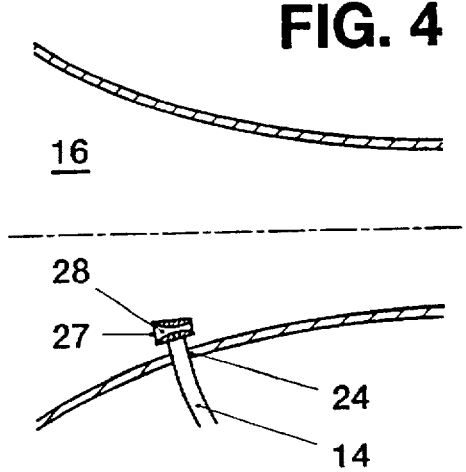
FIG. 4 shows a representation according to FIG. 3, but with a nozzle arranged in the compressor inlet.

In a further embodiment, instead of the small tube 26, a nozzle 27 is arranged in the compressor inlet 16 and is connected at its nozzle neck 28, that is to say at the point of its lowest static pressure, to the air conduit 14 (FIG. 4).

When the device is in operation, a negative pressure in relation to the normal pressure of the ambient air 19 prevailing in the oil sump 12 is imparted to the negative pressure chamber 6 by the compressor inlet 16 via the first air conduit 14. This pressure difference is utilized to convey the lubricating oil 23 into the centrifuges 4. The oil level in the negative pressure chamber 6 is established according to the pressure difference, approximately 10 mbar being sufficient for sucking in. At the same time, the float valve 22 prevents the lubricating oil 23 from infiltrating into the air conduit 14 or into the compressor inlet 16.

Because the inlet orifice 13 of the oil suction conduit 11 is arranged directly underneath the shaft 1, when the turbocharger is stationary the lubricating oil 23 cannot run back completely out of the negative pressure chamber 6 into the oil sump 12. The lubrication of the rolling bearings 2, 3 is thereby advantageously guaranteed already immediately after the renewed starting of the turbocharger.

As a result of the arrangement and particular design of the small tube 26 projecting into the compressor inlet 16, the useful negative pressure, that is to say, ultimately, also the pressure difference, is increased. Even at low rotational speeds, therefore, the pressure difference between the oil sump 12 and the negative pressure chamber 6 necessary for sucking in the lubricating oil 23 is guaranteed.

The lubricating oil 23 passes via the negative pressure chamber 6 into the centrifuges 4 connected thereto. As a result of the effect of centrifugal force, a rotating lubricating-oil ring 29 forms there in each case. The inner radius of the lubricating-oil rings 29 rotating in the centrifuges 4 is smaller than the radius on which the injection nozzles 10 are located. Consequently, even in the case of internally mounted turbochargers, it is possible to utilize the pressure of the lubricating oil 23 building up in the centrifuges 4 directly for its injection into the rolling bearings 2, 3. This pressure is higher by two to three orders of magnitude than that required for sucking in the lubricating oil 23.

Finally, the lubricating oil 23 passes back into the oil sump 12 again. In this case, the water cooling 21 proves beneficial, since the turbine heating would otherwise lead to a sharp rise in the temperatures of the lubricating oil 23.

Figure 5:
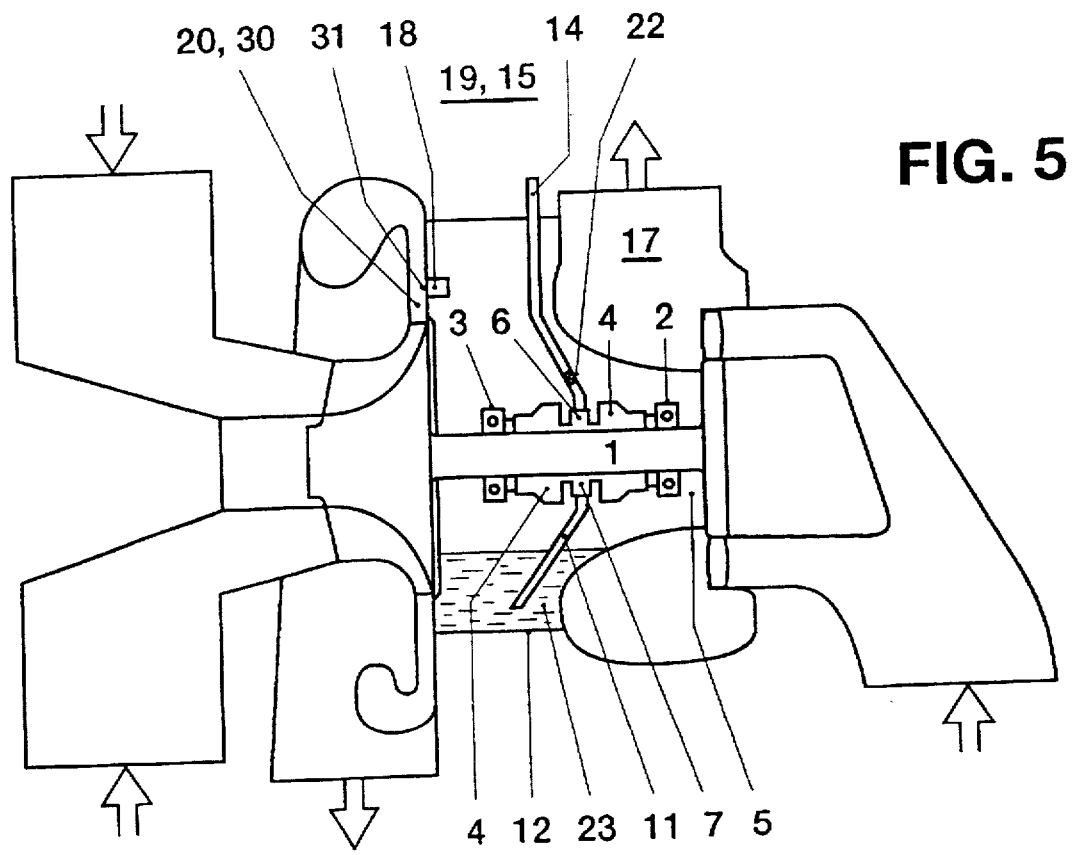
FIG. 5 shows a diagrammatic representation of the turbocharger in a further embodiment.

In another exemplary embodiment, the negative pressure chamber 6 connected to the oil sump 12 is connected via the first air conduit 14 to the ambient air 19. The float valve 22 is arranged in this air conduit 14. The oil sump 12 is made gastight and is connected via the second air conduit 18 to the compressor outlet 30 forming an overpressure region 20 in relation to the negative pressure chamber 6 (FIG. 5). In this case, the air conduit 18 opens out in a wall drillhole 31 of the compressor outlet 30.

When this device is in operation, an overpressure is applied to the oil sump 12 by the compressor outlet 30 via the second air conduit 18. Because the negative pressure chamber 6 is subjected to the normal pressure of the ambient air 19, a pressure difference occurs once again and is utilized for supplying the lubricating oil 23 into the centrifuges 4. All further cycles take place essentially in a similar way to the first exemplary embodiment.

Obviously, numerous modifications and variations of the present invention are possible in light of the above teachings. It is therefore to be understood that, within the scope of the appended claims, the invention may be practiced otherwise than as specifically described herein.

What is claimed is:

1. A method for autolubrication with lubricating oil of rolling bearings of a turbomachine having a turbine bearing side and a compressor bearing side, the method comprising the steps of:

building up a pressure in lubricating oil on each bearing side by way of respective hydraulic centrifuges;

injecting said lubricating oil into the rolling bearings;

sucking in the lubricating oil as the result of a pressure difference between the centrifuges and an oil sump;

imparting a lower pressure to the centrifuges than to the oil sump; and preventing flowoff of the lubricating oil to a region of a lower pressure, wherein pressure differences present in the turbomachine are utilized for the sucking of the lubricating oil into the centrifuges; and the pressure built up by the centrifuges is utilized directly for the injecting step.

2. The method as claimed in claim 1, wherein a normal pressure prevails in the oil sump and a negative pressure prevails in the centrifuges, the negative pressure being imparted by a negative pressure region of the turbomachine.

3. The device as claimed in claim 2, wherein the negative pressure region is a compressor inlet of the turbomachine.

4. The method as claimed in claim 1, wherein normal pressure prevails in the centrifuges and an overpressure is imparted to the oil sump, the normal pressure being supplied by ambient air and the overpressure being supplied by an overpressure region of the turbomachine.

5. The device as claimed in claim 4, wherein the overpressure region is a compressor outlet of the turbomachine.

6. A device for autolubrication of rolling bearings of a turbomachine having a turbine bearing side and a compressor bearing side, comprising:

centrifuges arranged on a shaft of the turbomachine and having axial lubricating bores, each centrifuge extending on one of the bearing sides;

an oil suction conduit which dips with its lower end into an oil sump and which is connected at its upper end to the centrifuges;

an element which is arranged annularly around the shaft and which is connected in its central region to the centrifuges and imparts to the centrifuges a negative pressure in relation to the oil sump, the element imparting the negative pressure is arranged stationarily and is a negative pressure chamber, the negative pressure chamber is connected via the oil suction conduit to the oil sump and via a first air conduit to a first pressure region; and a separating point is arranged between lubricating oil located in the centrifuges and the negative pressure region, the oil sump is connected via a second air conduit to a second pressure region of a higher pressure than the first pressure region.

7. The device as claimed in claim 6, wherein the negative pressure chamber is connected via the first air conduit to a compressor inlet, and the oil sump is connected via the second air conduit to ambient air.

8. The device as claimed in claim 7, wherein the first air conduit opens out in a wall drillhole of the first pressure region.

9. The device as claimed in claim 8, further comprising at least one hollow body projecting into the first pressure region and provided with at least one lateral orifice arranged in the wall drillhole and connected to the first air conduit.

10. The device as claimed in claim 8, wherein at least one nozzle having a nozzle neck is arranged in the first pressure region and is connected at the nozzle neck to the first air conduit.

11. The device as claimed in claim 6, wherein:

the oil sump is made at least essentially gastight;

the negative pressure chamber is connected via the first air conduit to ambient air; and the oil sump is connected via the second air conduit to a compressor outlet.

12. The device as claimed in claim 11, wherein the second air conduit is connected to the compressor outlet via a wall drillhole.

13. The device as claimed in claim 6, further comprising a cooling device arranged in the oil sump.

14. The device as claimed in claim 6, wherein the separating point is a float valve.

15. The device as claimed in claim 6, wherein the negative pressure chamber is connected via the first air conduit to a turbine outlet, and the oil sump is connected via the second air conduit to ambient air.

16. The device as claimed in claim 6, wherein the first pressure region is a negative pressure region of the turbomachine.

17. The device as claimed in claim 6, wherein the second pressure region is an overpressure region of the turbomachine.

18. A method for lubricating bearings of a turbomachine with lubricating oil comprising the steps of:

creating a region of low pressure outside of a hydraulic centrifuge and a region of high pressure in the turbomachine, the region of low pressure and region of high pressure establishing a pressure difference;

using the pressure difference to suck a lubricating oil from an oil sump into the hydraulic centrifuge;

rotating the hydraulic centrifuge to inject the lubricating oil into the bearings; and preventing the sucked lubricating oil from flowing into the region of low pressure.

19. A device for lubricating bearings of a turbomachine, the device comprising:

centrifuges mounted on a rotatable shaft of the turbomachine, each centrifuge being in fluid communication with a respective bearing of the turbomachine;

a negative pressure chamber mounted on the centrifuges, the chamber being stationary with respect to the centrifuges;

an oil sump holding a lubricating oil;

a first conduit connected to a low pressure region and communicating the low pressure region with the negative pressure chamber;

a second conduit connected to a high pressure region and communicating the high pressure region with the oil sump;

an oil suction conduit communicating the lubricating oil in the oil sump to the negative pressure chamber, the negative pressure chamber being in fluid communication with the centrifuges, and the centrifuges being in fluid communication with the bearings of the turbomachine so that the lubricating oil may flow from the oil sump through the negative pressure chamber and the centrifuges to the bearings; and a separating point located between the lubricating oil in the centrifuges and the low pressure region for preventing the lubricating oil in the centrifuges from infiltrating the low pressure region.

* * * * *